Dec. 14, 1965    B. A. SHOOR ETAL    3,222,919
MECHANICAL IMPEDANCE MEASURING SYSTEM
Filed Jan. 12, 1962    3 Sheets-Sheet 1

INVENTORS.
BERNARD A. SHOOR
DALE R. BURGER
BY
Reed C. Lawlor
ATTORNEY.

Dec. 14, 1965

B. A. SHOOR ETAL 3,222,919

MECHANICAL IMPEDANCE MEASURING SYSTEM

Filed Jan. 12, 1962

INVENTORS.
BERNARD A. SHOOR
DALE R. BURGER

BY Reed B. Lawlor

ATTORNEY.

United States Patent Office 3,222,919
Patented Dec. 14, 1965

3,222,919
MECHANICAL IMPEDANCE MEASURING SYSTEM
Bernard A. Shoor and Dale R. Burger, Pasadena, Calif., assignors to Endevco Corporation, Los Angeles, Calif., a corporation of California
Filed Jan. 12, 1962, Ser. No. 165,735
8 Claims. (Cl. 73—67.1)

This invention relates to systems for measuring vibratory properties of mechanical devices and more particularly, to an improved system for measuring mechanical impedance.

Methods have been developed for determining the vibratory properties of mechanical systems from a knowledge of the vibratory properties of parts of the systems. The vibratory properties of a mechanical system are often described in terms of mechanical impedance or in terms of mobility, which is the reciprocal of impedance. The method for making such determinations is somewhat analogous to those that are employed for determining the electrical properties of composite electrical circuits from the properties of parts of the circuits. As is well known it is possible to determine how the response of an electrical circuit changes when a change is made in the electrical circuit either by the addition of electrical components or their removal. When a change is made in a mechanical system vibratory properties of the altered system can be determined if the mechanical impedance properties of the original system are known and also the mechanical impedance properties of the parts added or removed.

The mechanical impedance of a mechanical device often varies with frequency in a very complicated manner. For this reason, it is often better to measure the mechanical impedance rather than try to calculate it from fundamental physical principles.

Two kinds of mechanical impedance concepts are in common use. One is tranfer impedance, the other is driving-point impedance. In either event the mechanical impedance is the ratio of the force applied at a point and the velocity of a particle at a point. Where the force and the veloctiy are referred to different points, the ratio is of the transfer impedance from one point to another. Where the force and velocity are referred to the same point, the impedance is known as the driving-point impedance. This invention relates particularly to systems for measuring driving-point impedance. The value of the driving-point impedance is related to the force applied to a point and the velocity and acceleration of a particle at that point by the equation $$Z = \frac{F}{x'} = \frac{j\omega F}{x''} \quad (1)$$

Usually it is desired to know the impedance as a function of frequency. Accordingly, at any one frequency the terms in the foregoing expression have the following meanings:

$F$=amplitude of the force applied at the point in question at a particular frequency $f$.
$x'$=the velocity of a particle at that point.
$x''$=the acceleration of the particle
$\omega = 2\pi f$
$f$=frequency of vibration
$j = \sqrt{-1}$ Usually, to simplify the mathematical representation, a system of complex numbers is used. Where the force $F$ varies sinusoidally, it is represented in such system by the equation $$F = F_0 e^{j\omega t} \quad (2)$$

Likewise, where the velocity varies sinusoidally in response to that force it is expressed by the equation $$x' = x'_0 e^{j(\omega t - \phi)} \quad (3)$$

And likewise, where the acceleration varies sinusoidally $$x'' = x''_0 e^{j(\omega t - \theta)} \quad (4)$$

In the foregoing equations the following definitions apply:

$F_0$=amplitude of the driving force.
$x'_0$=amplitude of the velocity at the point at which the force is applied.
$x''_0$=amplitude of the acceleration at the point at which the force is applied.
$\phi$=the angle in radians by which the velocity lags the applied force.

The angle $\phi$ is a portion of the cycle in radians by which the maximum velocity is delayed behind the maximum force.

$\theta$=angle in radians by which the acceleration lags the force.

The angle $\theta$ is the portion of the cycle in radians by which the maximum acceleration is delayed behind the maximum force.

$$\theta = \phi - \frac{\pi}{2} \quad (5)$$

From the foregoing equations, it is clear that the mechanical impedance is given by the formula $$Z = \frac{F_0}{x'_0} e^{j\phi} = \frac{\omega F_0}{x''_0} e^{j\theta} \quad (6)$$

In actuality, the force and velocity are accurately represented by the real parts of Equations 2 and 3.

It is apparent from Equation 6 that the mechanical impedance Z can be determined from the amplitude $F_0$ of the force and the amplitude $x'_0$ of the velocity at a point and the angle $\phi$ by which the velocity lags the force or from the amplitude of the force and the amplitude $x''_0$ of the acceleration and the angle $\theta$ by which the acceleration lags the force and the frequency $f$.

As is clear from the earlier explanation, if the point at which the measurement of velocity is made is not the same as the point to which the driving force is applied, the value of impedance Z determined from the measurements is not the driving-point impedance but is a transfer impedance.

The principal object of this invention is to provide an improved system for accurately measuring driving-point impedance. This object is achieved by providing an improved system for measuring the velocity of a mechanical system at the point where the force is applied.

More particularly, in accordance with this invention, a vibration testing system is provided which includes means for applying a sinusoidal force to a mechanical device over a very small area thereof, together with means for measuring that force, the velocity of a point at the center of that area and the phase difference between the velocity and the force. An important part of the impedance-measuring apparatus of this invention is a special impedance head. In the form of the impedance head illustrated and described herein, the head comprises a pair of centrally apertured parallel plates, a number of cylindrical posts interconnecting the plates, means passing through the center of the impedance head for holding the impedance head in place, means for applying a force through the impedance head to the small area of a mechanical device, means for detecting strain in those posts, and means for detecting the motion of one of the plates.

In employing the impedance head of this invention, means are provided for transmitting a force from said one plate to a small area of the mechanical device being tested and a mechanical vibrator is connected directly to the other plate. With this arrangement, the first-mentioned plate moves with the test area under the influence of the force that is applied to the lower plate through the posts mentioned. Accordingly, a measurement of the strain in those posts is a measure of the force applied and the motion of the plate that is connected to the mechanical device represents the motion at the test area. In the embodiment of the invention illustrated the motion is detected by means of a plurality of motion detectors that are in the form of accelerometers.

As explained more fully hereinafter, the force detectors and the motion detectors are arranged symmetrically along the periphery of a common circle. In the impedance head employed, the center of action of the force detectors and the center of action of the motion detectors coincide and extend along an axis, herein called the impedance axis, that intersects the center of the test area. By measuring both the force and motion along the same circle and by other features of this invention, effects of bending of the plates while in use are greatly reduced. For these reasons, the measurements made may be employed to determine accurately the driving-point impedance of the mechanical device over that area.

The foregoing features and other features of this invention, and the foregoing and other objects of this invention, together with various advantages thereof, will be apparent from the following specification taken in connection with the accompanying drawings wherein.

Figure 1:
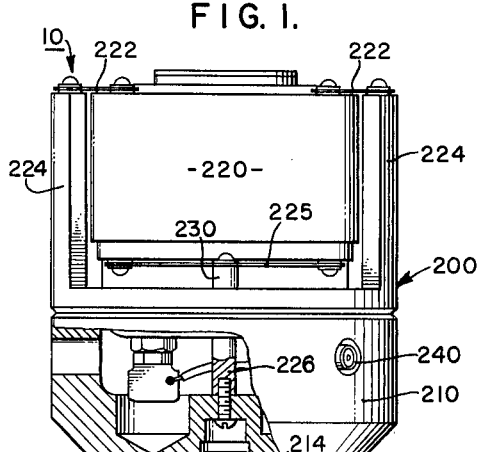
FIGURE 1 is an elevational view, partly in section, of a mechanical-impedance measuring system embodying the present invention.

The invention will be described herein with reference to an arrangement in which the force is applied along a vertical axis and the acceleration is measured along that axis. More particularly, in the embodiment of the invention illustrated, a mechanical-impedance measuring system comprises two parts, a mechanical test unit and an electrical unit including a driving oscillator and a measuring system. The mechanical test unit 10 is connected by means of a threaded bolt 12 to a horizontal plate 14 at a test area 16 of a mechanical device under investigation. As shown in FIG. 1 when the test unit is vibrated sinusoidally by electrical energy supplied from a generator or oscillator (not shown) the test area vibrates in a corresponding way depending on the frequency of signal supplied by the oscillator and the mechanical impedance of the device as it appears at that area from an external point.

The object of the test to be described is to determine how the velocity or acceleration of the plate 14 at the area of contact 16 varies with the applied force at different frequencies. For this purpose the frequency of oscillation, the amplitude of the force, the amplitude of the acceleration, and the phase difference between the acceleration and the force are measured at different frequencies by electrical means. In accordance with this invention the acceleration is measured at substantially the same point to which the force is applied so that the resultant impedance determined represents the driving-point impedance over the area 16 of contact between the mechanical measuring unit 10 and the mechanical device of which the plate 14 forms a part. This impedance is particularly significant, if the device 14 is to be modified by connecting another mechanical part or system to it by bolting the added part to the device 14 by making contact over the test area or an equivalent area.

Figure 2:
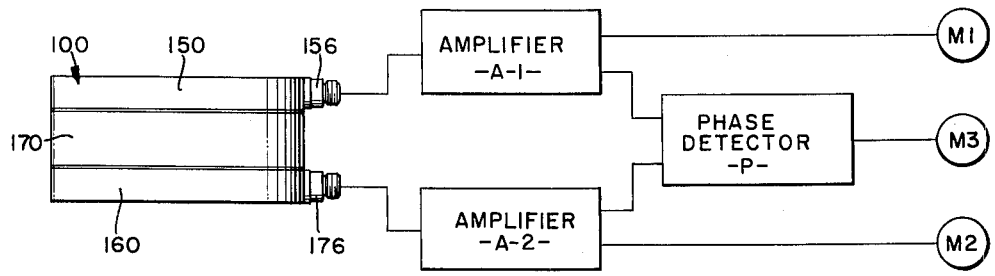
FIG. 2 is a schematic wiring diagram of a system employed for measuring the amplitudes of the force and acceleration and the phase difference between them.

The mechanical unit 10 comprises the mechanical and electro-mechanical units illustrated in FIG. 1. More particularly, the mechanical unit comprises an impedance head 100, a shaker 200, and a removable adapter or coupler 20. The electrical unit includes an oscillator (not shown) that is employed for causing the shaker to vibrate at any predetermined frequency. In addition, as shown in FIG. 2, an amplifier A1 and meter M1 are employed for measuring the amplitude $F_0$ of the sinusoidal force applied at that frequency, an amplifier A2 and meter M2 are employed for measuring the amplitude $x_0''$ of the acceleration at that frequency and a phase detector P and meter M3 are employed for indicating the phase lag $\theta$ of the acceleration relative to the applied force at that frequency.

The shaker 200 is of conventional type but is provided with a base adapted for use with the impedance head of this invention. The housing structure of the shaker 200 includes a base member 210 having an extended flat bottom or end surface 212. The base member is provided with a central threaded bore 214. In addition, the shaker 200 comprises an electro-magnetic vibrator 220 that is supported by means of leaf springs 222 from posts 224 that extend upwardly from the base member 210. The vibrator 220 is connected by means of a center bar or rod 230 and springs 225 to the base 210. The oscillator referred to is electrically connected to the driver 220 through an electrical connector 240. With this arrangement, when alternating current is applied to the electro-magnetic driver 220 the base 210 is forced upwardly and downwardly in a sinusoidal manner thereby providing a sinusoidal driving force which is employed to drive a mechanical device under test at that frequency.

The force provided at the base 210 of the shaker 200 is applied through the impedance head 100 and the coupler 20 to a small test area 16 of the plate 14. Firm coupling is achieved by means of a bolt 12 which extends through the coupler 20 and through the impedance head 100 into the threaded bore 214 in the base 210. It will be noted that the coupler 20 is of conical configuration and is provided with a truncated apex thus forming a small flat surface at its lower end to facilitate concentration of the applied force on the small test area 16. In this connection it is to be borne in mind that the system may be coupled to a plate 14 or to some other portion of a mechanical device under investigation by other means such as by welding or even such as by simply resting the coupler 20 on the test area where the driving-point impedance is to be determined.

A suitable shaker, for example, may be a force generator, manufactured by Goodman's Industries, London, England. Such a force generator provides sinusoidal vibrations at frequencies that range from about 10 c.p.s. to about 10,000 c.p.s.

Figure 6:
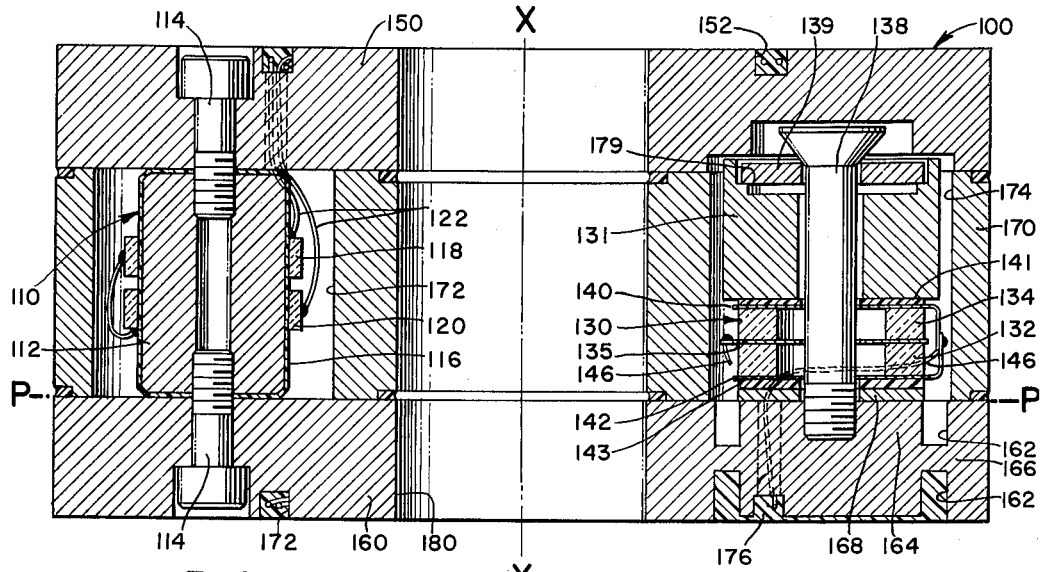
FIG. 6 is a sectional view of the impedance head taken on the plane 6—6 of FIGS. 3 and 4.
Figure 7:
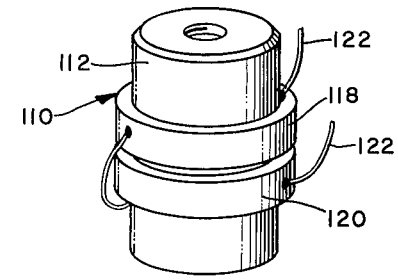
FIG. 7 is a perspective view of the force detector of the impedance head of FIG. 5.
Figure 5:
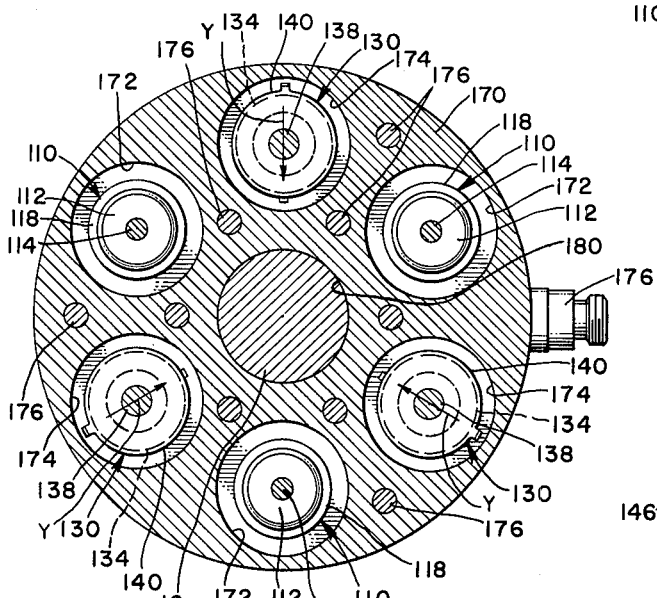
FIG. 5 is a sectional view of the impedance head taken on the plane 5—5 of FIG. 1.
Figure 8:
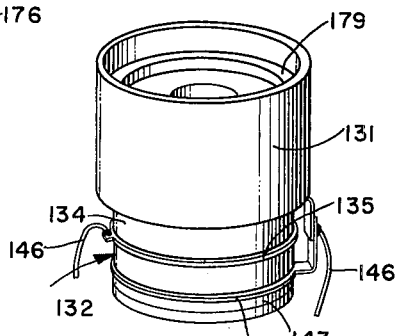
FIG. 8 is a perspective view of one of the accelerometers of the impedance head of FIG. 5.

As shown in the drawings and specifically in FIGS. 5 and 6, the impedance head of this invention employs three force sensing units 110 and three accelerometers 130 mounted between upper and lower plates 150 and 160 that are rigidly fastened to a spacer 170 that separate the plates. More particularly, the plates 150 and 160 and the spacer 170 provide a supporting structure for the force-sensing elements 110 and the accelerometers 130, and also acts as a unit for transmitting forces from the shaker 200 to the base plate 160 and coupler 20 and thence to the object under test. The two end plates 150 and 160 are parallel and both the plates and the spacer 170 are provided with coaxial bores thereby providing an annular structure having a central bore or passage 180 extending therethrough along a central impedance axis X—X.

Figure 3:
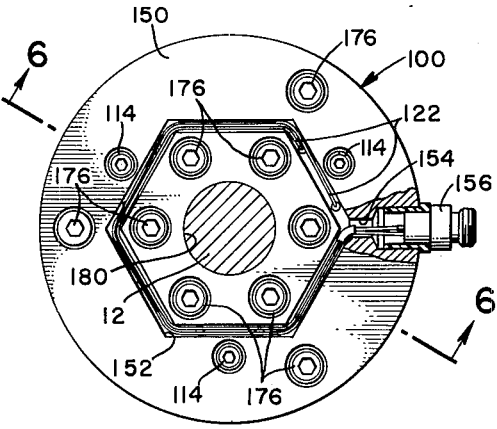
FIG. 3 is a transverse view, partly in section, taken along the plane 3—3 of FIG. 1.
Figure 4:
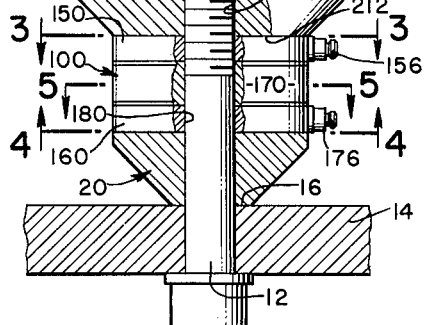
FIG. 4 is a transverse view, partly in section, taken along the plane 4—4 of FIG. 1.

The spacer 170 is provided with two sets of bores 172 and 174 of the same size. The bores of the two sets are arranged alternately in six-fold symmetrical fashion about the axis X—X and at a uniform radial distance therefrom. The three force-sensing units 110 are arranged in cavities provided by the bores 172 of one set and the accelerometers 130 are arranged within cavities provided by the bores 174 of the other set. In this way, the three force-sensing units 110 are arranged in equilateral triangular symmetrical fashion about the axis X—X and are uniformly spaced from that axis. Similarly, the three accelerometers 130 are arranged in equilateral triangular symmetrical fashion about the axis X—X and are uniformly spaced from that axis. The force sensing units and the accelerometers are all mounted on a common circle centered on the axis X—X. The supporting structure provided by the spacer 170 and the plates 150 and 160 are rigidly secured together by means of screws 176 as indicated in FIGS. 3, 4, and 5.

Each of the force-sensing units 110 comprises a cylindrical body or post 112 that is rigidly held in place between the end plates 150 and 160 by means of screws 114. The posts 112 are anodized to form insulating coatings 116 on the outer surface thereof. The force transducing elements include rings 118 and 120 of piezoelectric material mounted under tension about the cylindrical body 112. The inner and outer surfaces of the rings are coated with silver or other conducting material to provide an inner and an outer electrode on each of the crystals. The two annular rings are polarized radially in the same direction, and, they are so connected electrically to a corresponding pair of signal conductors 122, 122 that an electromotive force is developed across the conductors 122, 122 in proportion to the force impressed across the two end plates 150 and 160. To this end in each force detector, the inner electrode of one ring is electrically connected to the outer electrode of the other ring and the conductors are connected to the remaining electrodes. By virtue of the fact that the outer surface of the posts 112 are covered by an insulating coating 116, the piezoelectric crystals are electrically connected in series between the conductors 122 while still being mutually insulated otherwise from each other and from the reminder of the impedance head.

It will be understood that when a force is applied across the two plates 150 and 160, the posts 112 contract or expand, depending upon whether the force is a compressive force or a tension force thereby causing the posts 112 to expand and contract radially. Such radial expansion and contraction of the posts 112 causes the piezoelectric rings 118 and 120 to expand and contract along their peripheral axes thereby generating the required electromotive forces between their cylindrical surfaces. The radial expansion and contraction of the posts 112 caused by longitudinal contraction and expansion thereof respectively, occurs because of the fact that the posts are composed of solid material whereby the total volume of the posts remains nearly constant as longitudinal forces are applied thereto. The ratio of radial expansion to longitudinal expansion or contraction is known as Poisson's ratio.

By employing a spacer 170 that has a large cross section compared with the total of the cross-sections of the posts 112 of the force-sensing elements, a large fraction of the force applied across the end plates 150 and 160 is applied to the spacer while only a small fraction is applied to the force-sensing elements. By thus sharing the applied force between the spacer and the force-sensing elements, larger forces than otherwise possible if the spacer were omitted may be applied across the plates without straining the parts excessively. The plates 150 and 160, and the screw 12 are composed of metal, such as steel, to provide a rigid elastic structure. With this arrangement, the application of excessive loads to the piezoelectric crystals 118 and 120 is avoided.

Each of the accelerometers 130 is mounted on the lower plate 160 within a corresponding cavity 174. Each of the accelerometers 130 comprises a pair of annular piezoelectric units or discs 132 and 134 mounted between the base plate 160 and an inertia member or mass 131. A screw 138 extends through a spring washer 139 and the inertia member 131 and through the piezoelectric discs 132 and 134. The screw 138 engages the spring washer but is spaced radially from all other parts of the accelerometer. The spring washer 139 rests on an annular shoulder 179 formed in a stepped countersink at the upper end of the inertia member 131. The screw 138 acting through the spring washer compresses the piezoelectric elements between the inertia member 131 and the base plate 160.

The upper and lower surfaces of the two crystals are coated with silver or other conducting material to provide electrodes. The adjacent surfaces of the two piezoelectric discs 132 and 134 engage an intervening annular foil electrode 135 while the two surfaces of the two piezoelectric units that are remote from each other contact corresponding foil electrodes 140 and 142 which are electrically connected together. The outer electrodes 140 and 142 are insulated from the remainder of the system by means of insulating washers 141 and 143. The central foil electrodes 135 are connected to one electrical conductor 146 while the outer two foil electrodes 140 and 142 are connected to another electrical conductor 146.

The two piezoelectric elements are polarized electrically along a vertical axis parallel to the impedance axis X—X. The two polarization axes in the crystals are anti-parallel, that is, they extend in opposite directions. By virtue of this anti-parallel relationship the voltages generated across the outer horizontal surfaces of the two crystals are the same and the voltages developed at the internal or adjacent surfaces of the two crystals are the same. For this reason whenever the two crystals are compressed along a vertical axis a voltage proportional to the acceleration is developed across the two conductors 146, 146.

The spring 139 is made relatively soft so that it does not greatly affect the resonant frequency of accelerometer. Such a spring 139 and screw 138 are not essential. Instead of employing them to hold the inertia member assembled with the piezoelectric elements, the inertia member, the piezo electric discs, the foil electrodes and the insulating washers may be cemented together with some suitable material.

Circular grooves 162 are cut in opposite sides of the base plate 160 concentric with the accelerometers, thus forming a rigid circular block or island 164 that is connected with the remainder of the base plate by means of a reduced circular wall portion 166. The lower or outer surface of each island is cut to space it from the lower or outer surface of the base plate and the external space opposite each island is filled with plastic. The reduced portion has high shearing rigidity or stiffness in a direction parallel to the axis X—X but is capable of bending readily. Furthermore, the stiffness is such that the islands move with the remainder of the base plate in the direction of the impedance axis. This result is achieved in part by establishing the stiffness at such a value relative to the inertia of the islands and accelerometer that the resonant frequency of each island and its corresponding accelerometer is very high compared with the frequency at which measurements are to be made. Each island is coaxial with the corresponding accelerometer mounted on it. For these reasons motion along the accelerometer is sensitive to motion along the impedance axis and measures it correctly but is very insensitive to bending the base plate 160. To further render the accelerometer insensitive to such bending action, a rigid washer 168 comprised of tungsten carbide is mounted between the piezoelectric discs of each accelerometer and the island beneath it.

When the accelerometer 130 is subjected to an alternating acceleration having a component parallel to the impedance axis X—X the piezoelectric elements formed by the two piezoelectric discs 132 and 134 of each accelerometer are alternately compressed and extended between the base 160 and the inertia member 131 causing an alternating electric potential to be generated across the two conductors 146, 145. The electrical output of each accelerometer is proportional to the acceleration over a wide frequency range below the resonant frequency of the accelerometer. In practice such accelerometers have been constructed that have constant sensitivity within about 5% over a range from about 2 c.p.s. to 5000 c.p.s.

The upper plate 150 is provided with a hexagonal groove 152 which is adapted to receive the electrical conductors 122, 122. This end plate is further provided with a radially extending electrical connector 156 which communicates with the hexagonal recess through a hole 154. The three force-sensing units are connected in parallel by electrical conductors 122 that terminate in the connector 156. However, the force-sensing units may be connected in series.

Similarly, the lower plate 160 is provided with a hexagonal groove 172 which is adapted to receive electrical conductors 146, 146. This end plate is further provided with a radially extending electrical connector 176 which communicates with the hexagonal recess through a hole 174. The three accelerometers are connected in parallel through electrical conductors 146, 146 that terminate in the connector 176. However, the accelerometers may also be connected in series.

In practice, it is found that such an accelerometer has a cross-axis sensitivity caused by slight deviations in the piezoelectric rings 132 and 134. To reduce effects of such cross-axis sensitivity the axis Y of maximum cross-axis sensitivty of the accelerometers are directed radially as indicated in FIG. 5. Such an arrangement is generally very effective inasmuch as the magnitude of cross-axis sensitivity will generally be of about the same magnitude in different accelerometers. Alternatively, the axes Y of maximum cross-axis sensitivity are directed in any other directions in which the angle between the respective pairs of vectors are all equal. But in case the magnitudes of cross-axis sensitivity are not equal but differ substantially from each other, the three-cross-axis sensitivity axes are arranged in some other way which would result in causing the vector sum of the cross-axis sensitivities to be substantially zero, or in any event less than the largest of the cross-axis sensitivities. This is possible whenever the cross-axis sensitivity of each accelerometer of an impedance head is less than the algebraic sum of the cross-axis sensitivities of the other two accelerometers.

The piezoelectric elements 118, 120, 132 and 134 are composed of ceramic piezoelectric material such as barium titanate or lead metaniobate or a mixture of lead zirconate and lead titanate. The end plates 150 and 160 and the screw 12 are composed of stainless steel. The spacer 170 and the posts 112 are composed of aluminum.

The plates have a thickness of about 0.25 inch, while the spacer has a thickness of about 0.5 inch. The posts have lengths equal to the thickness of the spacer and diameters of about 0.3 inch. The holes that form the cavities in the spacer have a diameter of about 0.5 inch. By employing a spacer having cavity-forming holes of the same size and uniformly spaced thereabout on a circle, the strain in the unit is uniform at the cavities, thus enhancing the accuracy and reliability of the measurements made. By eliminating the need to employ a screw threadably attached to the base plate, spurious strains that might vary from one mounting to another are avoided.

The annular structure of the impedance head makes it possible to attach the impedance head, either directly to an object undergoing tests or through a coupler, by passing a bolt through a hole in the object through the impedance head into the base of the shaker. With this type of arrangement it is possible to employ a very small coupler 20, when one is needed, so that in any event the force is applied from the shaker through a stiff unit. In practice, such close coupling is attained by screwing the impedance head to the object by means of a bolt under tension.

The impedance head described has a diameter of about 2 inches. The area of contact of the coupler 20 with the plate 14 was about 0.23 inch$^2$. The total weight of the coupler was about 0.75 lb. while the impedance head also had a weight of 0.75 lb. However, the effective weight of the impedance head, that is, the weight which could be considered rigidly attached to the coupler was only about 0.3 lb.

The effective impedance of the mechanical test unit 10 is essentially inertial, being given approximately by the formula:

$$Z = \frac{j\omega 1.05}{386} = \frac{1.05\omega}{386} e^{\frac{\pi}{2}j}$$

The impedance is given here in units of lb. sec./in. For accurate work the effective inertia of the mechanical test unit 10 should be subtracted from the mechanical impedance as measured, but where the mechanical impedance of the load is high, such correction is not necessary.

The impedance testing unit 10 of this invention is relatively insensitive to errors that might otherwise be caused by the bending of the unit 10 during vibration. This relative insensitivity to bending is achieved partly by the use of a rigid, solid core or spacer 170 and partly by the distribution of separate, or individual force-sensing units and accelerometers at equal distances about the impedance axis and partly by the special mounting of the accelerometers.

As illustrated schematically in FIG. 2, the combined output of the three force transducing units is applied to the input of the amplifier $A_1$. Likewise, the combined output of the three accelerometers is applied to the input of amplifier $A_2$. Accordingly, the meter $M_1$ indicates the sum or average of the signals produced by the three force transducing units 110 while the meter $M_2$ indicates the sum or average of the signals generated by the three accelerometers 130. The phase detector P coacts with the meter $M_3$ to indicate the phase lag of the acceleration behind the applied force.

By virtue of the fact that the three force transducing units 110 are of equal sensitivity and are uniformly spaced at equal radii about the impedance axis X—X, the signal produced by these three force transducing units represents the average or effective force applied about a circle centered on the impedance axis X—X. Similarly, by virtue of the fact that the three accelerometers 130 are of equal sensitivity and are uniformly spaced at equal radii about the impedance axis X—X, the signal produced by these three accelerometers represents the average or effective acceleration existing about a circle centered on the impedance axis X—X. Since the average force and the average acceleration are measured at the same circle, effects of bending are greatly reduced and the ratio of the force and acceleration so measured represents the ratio of force and acceleration existing at the center of the base plate.

Figure 9:
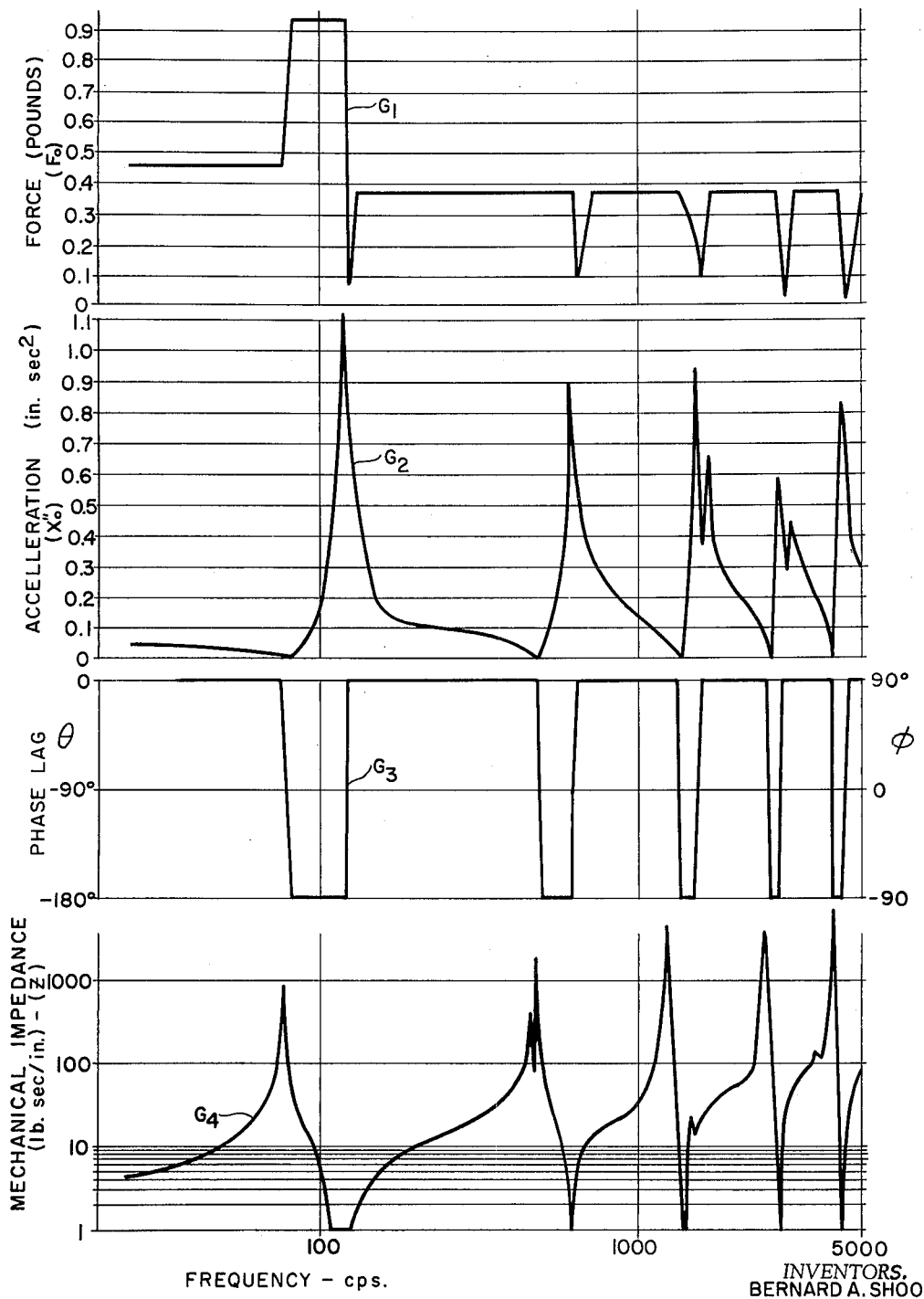
FIG. 9 is a graph employed to illustrate an application of the invention.

In FIG. 9 a number of graphs are shown that represent various measurements at different frequencies and the results calculated therefrom. In this figure graph $G_1$ indicates how the amplitude $F_0$ of the force varied over a wide frequency range. Graph $G_2$ indicates how the amplitude $x''_0$ of the acceleration varied. Graph $G_3$ indicates how the phase lag $\theta$ of acceleration relative to the force varied. The same graph indicates on a different scale marked $\phi$ how the velocity lagged the force. Graph $G_4$ indicates how the mechanical impedance Z varied over the frequency range. The data represented in graphs $G_1$, $G_2$ and $G_3$ were measured. The values indicated in graph $G_4$ were calculated from equation:

$$|Z| = \frac{\omega F}{x_0''}$$

Figure 10:
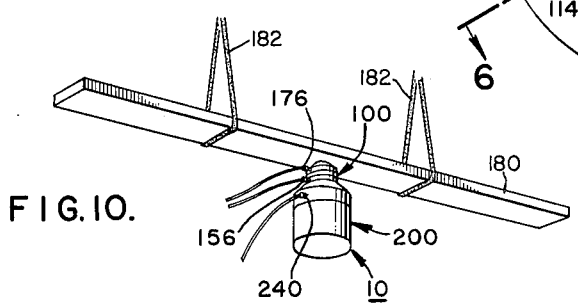
FIG. 10 is a sketch showing how the system of this invention has been employed in a simple case.

The measurement represented in the graphs of FIG. 9 were made on a very simple device which consisted of a flat bar 180 of aluminum ¾ in. thick, 3 in. wide and 36 in. long. The bar was suspended with its smallest dimension vertical by means of rubber bands 182 symmetrically spaced 18 in. apart, as shown in FIG. 10. The mechanical unit 10 shown in FIG. 1 was connected to the plate and allowed to hang freely downwardly therefrom. In the data represented in FIG. 9 force is given in pounds weight, acceleration in units of inches per second, and mechanical impedance in units of lb. sec./in. In such a system of units the acceleration of gravity is 386 in./sec.² In this particular case, the effective impedance of the impedance head 100 and the coupler 20 were disregarded. That impedance is so small that it could be neglected, or disregarded, without affecting the computations materially. It will be noted from the graph $G_3$ that the phase reversed at each frequency at which resonance or anti-resonance occurred.

From FIG. 9 it is clear that the mechanical impedance of even a simple device can vary in a very complex manner over a wide frequency range. Experience has shown that it is very difficult to calculate what the mechanical impedance is, where the device under consideration is complex. For this reason it is very valuable to be able to measure the mechanical impedance. By virtue of this invention accurate measurements of the driving-point impedance at any point of an object may be measured. From such information it is possible to determine by relatively simple calculations how the object vibrates under different conditions and how the vibration may be modified by connecting another device having a known mechanical impedance at the point in question. The system described here is accurate for determining mechanical impedance at frequencies at which the wave length of vibrations in the mechanical device are long compared with the diameter of the area 16 of contact. Thus, in the event that the diameter of the area of contact is 1 inch, accurate measurements may be made at frequencies corresponding to wavelengths greater than about 0.5 ft., that is, at frequencies below about 10,000 c.p.s.

It is thus apparent from the foregoing description, that this invention provides an improved, reliable system for measuring driving-point impedance. While the invention has been described with reference to only a specific embodiment thereof, it will be understood that it may be embodied in many other forms. More particularly, it will be understood that other types of devices may be employed for detecting and measuring the applied force and that other types of motion detectors may be employed for detecting and measuring the movement at the point of application of the force. Additionally, it will be understood that other methods may be employed for applying an alternating force to the object under investigation. It is therefore to be understood that the invention is not limited to the specific embodiment thereof described herein but includes other forms within the scope of the appended claims.

The invention claimed is:

1. A mechanical impedance head comprising a cylindrical member having a plurality of axially extending cavities formed therein,
   a pair of circular end plates mounted at the respective ends of said cylindrical member,
   a plurality of solid elastic cylindrical bodies interconnecting said end plates and adapted to receive axial forces applied across said end plates and responsive to such forces by changing in length in proportion to such forces,
   each of said solid elastic cylindrical bodies being mounted within one of said cavities and secured to said end plates,
   means for detecting changes in length of said cylindrical bodies,
   a plurality of accelerometers mounted on one of said end plates,
   each of said accelerometers being mounted within one of said cavities.

2. A mechanical-motion impedance head as defined in claim 1 in which said cylindrical members are uniformly spaced about an impedance axis whereby the average strain represents the effective strain along said impedance axis, and
   in which said accelerometers are of uniform sensitivity and are uniformly spaced about said impedance axis whereby the average acceleration by said accelerometers represents the effective motion along said impedance axis.

3. In combination with a mechanical impedance head as defined in claim 1 in which a shaker is connected to the other of said end plates.

4. A mechanical impedance head comprising,
   a pair of parallel end wall members,
   a stiff element secured between said end wall members whereby a force applied to one of said end wall members is communicated to the other end wall member thereby causing the spacing between said end wall members to change,
   a plurality of separate strain detectors mounted between said end wall members for detecting the spacing between said end wall members, said strain detectors being mounted along respective lines that are spaced apart from each other, and that extend from one of said end wall members to the other,
   a plurality of separate motion detectors mounted on said other end wall member,
   means for securing said other end wall member in firm contact with a part of mechanical object under investigation,
   first means for averaging the signals generated by said strain detectors when a force is applied to said one end wall member, and
   second means for averaging the signals generated by said motion detectors.

5. A mechanical impedance head as defined in claim 4, in which the periphery of said stiff element is substantially congruent with the peripheries of said end wall members and in which said stiff element is provided with axial cavities and in which said strain detectors and said motion detectors are mounted in said cavities.

6. A mechanical impedance head as defined in claim 4 in which said strain detectors are of uniform sensitivity and are uniformly spaced about an impedance axis whereby the average strain represents the effective strain along said impedance axis, and
   in which said motion detectors are of uniform sensitivity and are uniformly spaced about said impedance axis whereby the average motion detected by said motion detectors represents the effective motion along said impedance axis.

7. In combination with a mechanical impedance head as defined in claim 6,
   first electrical means connected to said strain detector for indicating said average force,
   second electrical means connected to said motion detectors for indicating said average motion,
   means including a phase detector for indicating the phase lag of said average motion with respect to said average force,
   whereby the driving-point impedance of said device at said area may be calculated.

8. A mechanical impedance head as defined in claim 4 in which said end wall members and said stiff element are provided with coaxial passages that form a common passage extending through said impedance head in a direction normal to said end wall members.

References Cited by the Examiner

UNITED STATES PATENTS

| | | | |
|---|---|---|---|
| 2,488,348 | 11/1949 | Ruge | 73—141 X |
| 2,775,887 | 1/1957 | Hines | 73—141 |
| 2,824,243 | 2/1958 | Sargeant. | |
| 2,873,604 | 2/1959 | Samsel | 73—67 |
| 2,906,991 | 9/1959 | Camp. | |
| 3,030,803 | 4/1962 | Painter | 73—67 |

LEO SMILOW, *Primary Examiner.*

ROBERT EVANS, RICHARD C. QUEISSER,
*Examiners.*